(12) United States Patent
Debold

(10) Patent No.: US 7,389,589 B2
(45) Date of Patent: Jun. 24, 2008

(54) COMPOSITION TRANSFER PROPORTIONAL DRAWING GRIDS

(76) Inventor: Cindy Debold, 6400 Lakeshore Dr., Austin, TX (US) 78645

(\*) Notice: Subject to any disclaimer, the term of this patent is extended or adjusted under 35 U.S.C. 154(b) by 127 days.

(21) Appl. No.: 11/420,660

(22) Filed: May 26, 2006

(65) Prior Publication Data

US 2006/0265888 A1    Nov. 30, 2006

Related U.S. Application Data

(60) Provisional application No. 60/685,717, filed on May 27, 2005.

(51) Int. Cl.
*G01B 3/14* (2006.01)
*B43L 7/00* (2006.01)

(52) U.S. Cl. .............................. 33/1 B; 33/1 G; 33/1 K; 33/566

(58) Field of Classification Search .................. 33/1 B, 33/1 G, 1 K, 562–563, 566
See application file for complete search history.

(56) References Cited

U.S. PATENT DOCUMENTS

| 275,822 | A | * | 4/1883 | Hagan | 33/1 K |
| 1,679,927 | A | * | 8/1928 | Bell et al. | 33/430 |
| 4,498,238 | A | * | 2/1985 | Vaughn | 33/1 K |
| 5,636,461 | A | * | 6/1997 | Shewmaker | 33/1 K |
| 5,673,490 | A | * | 10/1997 | Hill | 33/1 G |
| 6,568,938 | B1 | * | 5/2003 | Prince et al. | 434/90 |
| 6,579,099 | B1 | * | 6/2003 | Pipes, Jr. | 33/1 K |
| 7,325,325 | B2 | * | 2/2008 | Gleeson | 33/563 |

\* cited by examiner

*Primary Examiner*—Yaritza Guadalupe-McCall

(57) ABSTRACT

Provided are systems for transferring a composition, the systems comprising a transparent grid substrate; lines on a surface of the transparent grid substrate, the lines comprising symmetrical grid lines and a proportional border around the symmetrical grid lines; said symmetrical lines being of an equal number vertically as horizontally, creating rectangles in the same proportion as the proportional border, thereby making a proportional grid. The systems further comprise a substantially uninterrupted transparent surface that receives a composition related to a scene, the scene viewed through the substantially uninterrupted transparent surface and the transparent grid substrate. The transparent grid substrate and substantially uninterrupted transparent surface are coupled such that the symmetrical grid lines and proportional border facilitate drawing the composition directly on the substantially uninterrupted surface in direct proportion to the size of a final substrate. Also provided are methods, the methods comprising selecting a scene; framing the scene with a transparent proportional drawing grid comprising a transparent grid substrate, the scene viewed through the drawing grid. The methods further comprise sketching a composition of the scene on a substantially uninterrupted transparent surface, the sketching directed on the substantially uninterrupted transparent surface by a proportional border and symmetrical grid lines affixed to the transparent grid substrate.

21 Claims, 4 Drawing Sheets

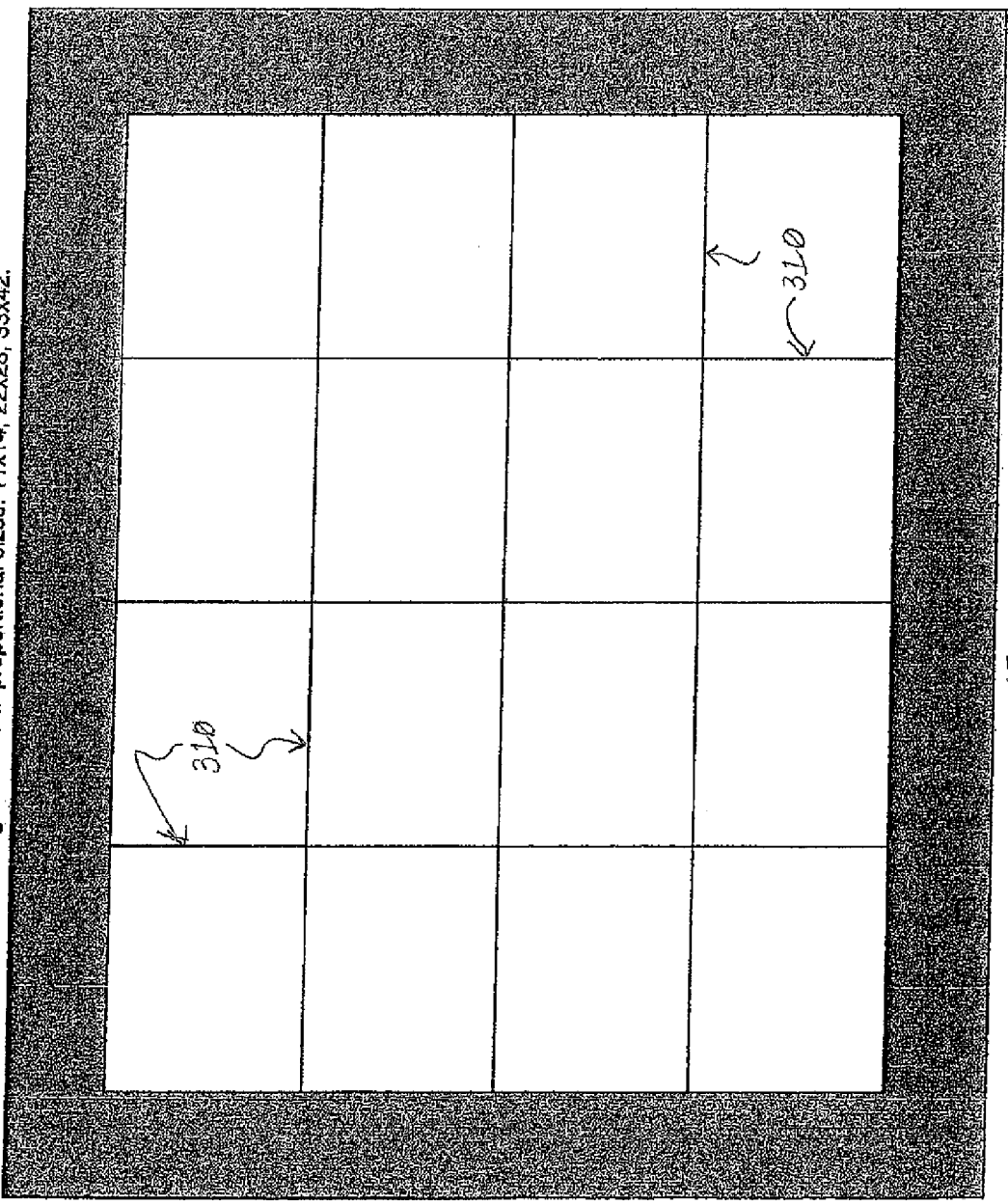

COMPOSITION TRANSFER PROPORTIONAL DRAWING GRIDS

CROSS-REFERENCE TO RELATED APPLICATIONS

The application claims the benefit of priority under 35 U.S.C. §119(e) from U.S. Provisional Application No. 60/685717, entitled, "Proportional Drawing Grids, Compose It Grids," filed on May 27, 2005, which disclosures are incorporated herein by reference.

BACKGROUND OF THE INVENTION

1. Field of the Invention

The present invention herein relates generally to a method and system for transferring an artist's composition to a drawing pad or canvas. More specifically, a method and system for more quickly, easily, and accurately sketching a composition of a scene and proportionally transferring the composition to a drawing pad or canvas.

2. Description of the Related Art

Drawing and painting on location can be very frustrating, especially creating a quality composition and then fitting the composition properly on paper or canvas. Grids have been primarily designed and used for copying and transferring a scene to a final substrate. Most grids to date have been somewhat complicated to set up, are not easy to transport, and/or are not effective for most applications, therefore, they are not commonly used.

Artists generally have not succeeded in reducing uncertainties associated with the processes of, first, sketching a composition and, second, transferring the composition to the final drawing pad or canvas. Currently artists primarily use the naked eye when sketching the scale and spatial relationships of different features from a scene to a composition. Similarly, artists also primarily use the naked eye when transferring and scaling a composition to the final drawing pad or canvas.

Thus, a need persists for ways of more quickly, easily, and accurately sketching a composition of a scene, and proportionally transferring the composition to a drawing pad or canvas.

BRIEF SUMMARY OF THE INVENTION

Provided are systems and methods for transferring a composition. In various embodiments, the systems comprise a transparent grid substrate; lines on a surface of the transparent grid substrate, the lines comprising symmetrical grid lines and a proportional border around the symmetrical grid lines; said symmetrical lines being of an equal number vertically as horizontally, creating rectangles in the same proportion as the proportional border, thereby making a proportional grid. The systems further comprise a substantially uninterrupted transparent surface that receives a composition related to a scene, the scene viewed through the substantially uninterrupted transparent surface and the transparent grid substrate. The transparent grid substrate and substantially uninterrupted transparent surface are coupled such that the symmetrical and proportional grid lines and proportional border facilitate drawing the composition directly on the substantially uninterrupted surface in direct proportion to the size of a final substrate.

In various embodiments, the methods of the present invention comprise selecting a substrate, selecting the substrate's ratio from a predetermined group of ratio's, choosing a proportional grid in the same ratio as the final substrate; selecting a scene; framing the scene with a transparent drawing grid comprising a transparent grid substrate, the scene viewed through the drawing grid. The methods further comprise sketching a composition of the scene on a substantially uninterrupted transparent surface, the sketching directed on the substantially uninterrupted transparent surface by a proportional border and symmetrical grid lines affixed to tie transparent grid substrate. The transparent grid substrate and substantially uninterrupted transparent surface are coupled such that the symmetrical grid lines and proportional border facilitate sketching the composition directly on the substantially uninterrupted surface in direct proportion to the size of a final substrate.

BRIEF DESCRIPTION OF THE DRAWINGS

In the following detailed description of embodiments of the invention, reference is made to the accompanying drawings, which form a part hereof, and in which is shown by way of illustration specific exemplary embodiments in which the invention may be practiced, and in which like numbers represent the same or similar elements and one or a plurality of such elements, as follows:

FIG. 4 is an illustration of a grid having a grid size ratio of 5.5:7 for transferring a composition in accordance with embodiments of the invention.

DETAILED DESCRIPTION

This description provides systems and methods for transferring compositions in accordance with embodiments of the present invention. In the following discussion and in the claims, the terms "including" and "comprising" are used in an open-ended fashion, and thus should be interpreted to mean "including, but not limited to . . . ".

DETAILED DESCRIPTION

In various embodiments, provided herein is a composition transfer system comprising: a transparent grid substrate; lines, either printed or otherwise appearing, on a surface of the transparent gild substrate; the lines including symmetrical grid lines and a proportional border around the symmetrical grid lines; said symmetrical lines being of an equal number vertically as horizontally, creating rectangles in the same proportion as the proportional border, making a proportional grid, thereby making what I call a proportional drawing grid; and a substantially uninterrupted transparent surface that receives a composition related to a scene, the scene viewed through the substantially uninterrupted transparent surface and the transparent grid substrate; wherein the transparent grid substrate and substantially uninterrupted transparent surface are coupled such that the proportional grid lines and proportional border facilitate drawing the composition directly on the substantially uninterrupted surface in direct proportion to the size of a final substrate.

Figure 1:
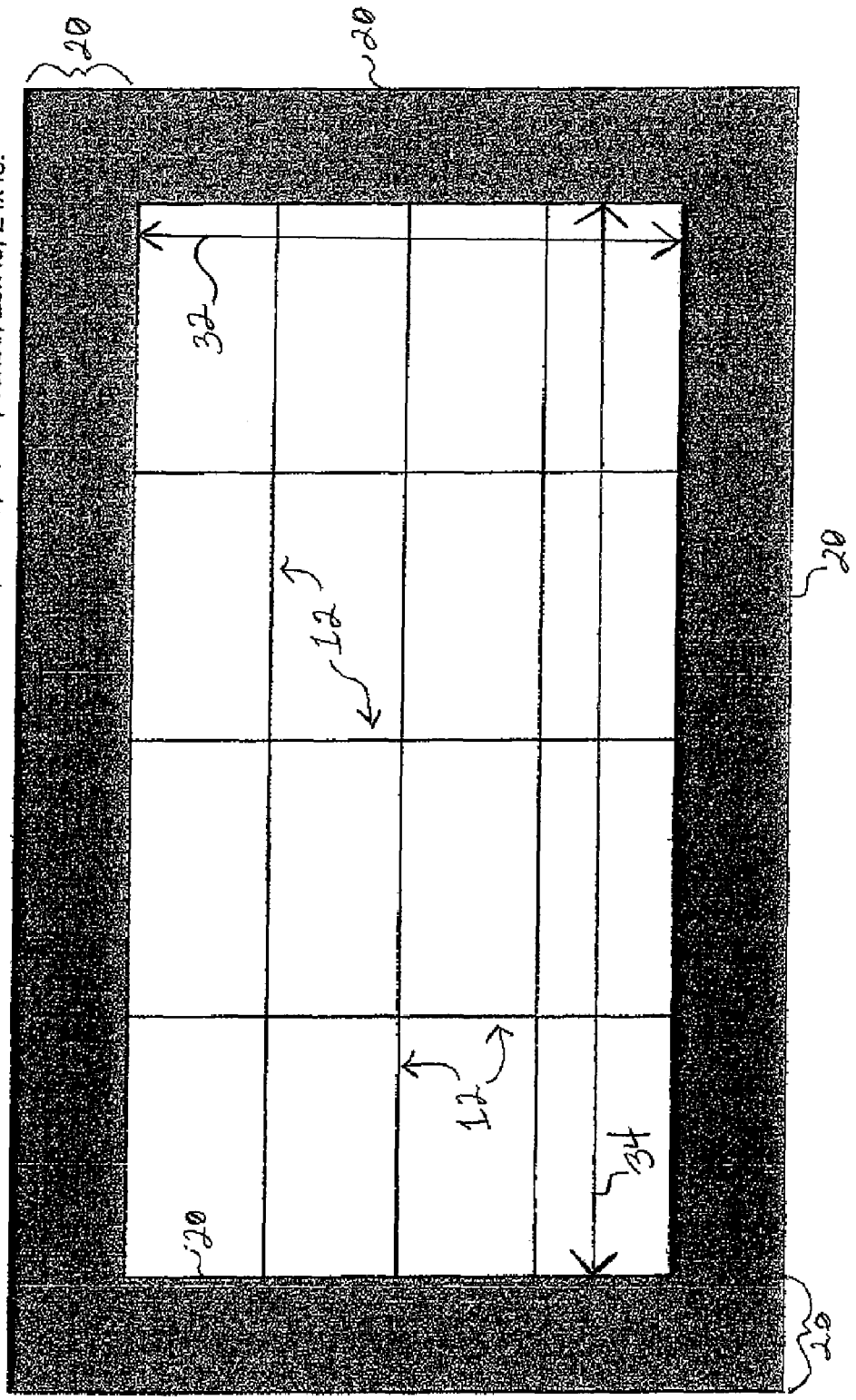
FIG. 1 is an illustration of a grid having a grid size ratio of 1:2 for transferring a composition in accordance with embodiments of the invention.

FIG. 1 is an illustration of a drawing grid 10 in accordance with embodiments of the present invention. The grid 10 includes symmetrical grid lines 12 that are affixed (via printing, copying, affixing tape, or other effective methods) to a surface of a transparent grid substrate (not visible). The transparent grid substrate permits an artist to view a scene through the drawing grid 10. A proportional border 20 frames the symmetrical grid lines 12. The border 20 may be any thickness, including the thickness of an individual grid line 12. While viewing a perspective of a scene through the drawing grid 10, the artist can sketch a composition on a substantially uninterrupted transparent surface (not visible). The artist views the scene through both the transparent grid substrate and the substantially uninterrupted transparent surface.

In some embodiments, the proportional border 20, symmetrical grid lines 12, and uninterrupted transparent surface are included on the same transparent grid substrate. In such instances, the symmetrical grid lines 12 are affixed on the bottom surface (not visible) of the transparent grid substrate and the substantially uninterrupted transparent surface is on the top surface (not visible) of the transparent grid substrate. When viewing a scene, the bottom surface including the symmetrical grid lines 12 is on the side of the substrate facing the scene, and the top surface including the substantially uninterrupted transparent surface is on the side of the substrate facing the artist. Thus, the scene would be viewed through the drawing grid 10 and the artist could sketch a composition on the substantially uninterrupted surface such that the sketching is directed by the symmetrical grid lines 12 and proportional border 20. Sketching of the composition directly onto the drawing grid while viewing the scene through the grid captures the scale and spatial relationships of features in the scene efficiently and accurately. Such a sketch on the top surface of the drawing grid 10 is by design directly proportional to the size of a final substrate.

In some embodiments, lines on the transparent grid substrate further comprise a measurement tool capable of measuring length, such as in centimeters or inches. The measurement capability can enhance the artist's ability to accurately sketch a composition and transfer the composition to a final substrate.

A final substrate for purposes of the present description is any substrate to which an artist will ultimately transfer a composition. Non-limiting examples of final substrates include drawing pads, canvases, and art boards. Such final substrates may possess any combination of dimensions as desired by the artist and suitable for a project. In particular for compatibility with embodiments of the present invention, the dimensions of a final substrate can reflect the dimensions of a composition transfer system as described herein. In various embodiments, the dimensional ratios of suitable final substrates are 1:1, 1:2, 1:3, 2:3, 3:4, 4:5, 5:6, 5.5:7, and 7:8. Final substrates may also feature symmetrical grid lines directly proportional to the symmetrical grid lines on a matching composition transfer system. Thus, the direct proportionality facilitates accurate transfer of a composition from a, for example, 1:3 system substrate to a directly proportional 1:3 final substrate.

The drawing grid 10 of FIG. 1 is designed with a grid size ratio of 1:2. Compositions sketched on the drawing grid having a grid size ratio of 1:2 are by design directly proportional to final substrates having certain dimensions. For example, compositions sketched on a drawing grid with a grid size ratio of 1:2 are directly proportional to canvases or drawing papers of various sizes: 6×12, 10×20, 12×24, 14×28, 16×32, 18×36, 20×40, 24×48, and so on. The direct proportionality between the drawing grid and final substrate facilitates quicker and more accurate transfer of the composition drawn directly on the drawing grid to the final substrate. The advantage of the direct proportionality is even more enhanced by use of a final substrate that bears a similarly proportioned grid, 1:2 in this case, thus permitting direct proportioning of the composition from the drawing grid to the grid of similar proportion on the canvas/paper.

The proportional border also contributes to direct proportionality when transferring a composition. In various embodiments, the dimensions of the symmetrical grid lines and proportional border are mutually adjusted to form a grid having effective proportions. In the embodiment illustrated by the approximately 1:2 grid size ratio of FIG. 1, for example, both the dimensions of the individual rectangles that make up the grid and the dimensions of the proportional border (height 32 and length 34) reflect about a 1:2 dimensional proportion. Thus, the grid having about a 3:4 grid size ratio in FIG. 2 includes grid lines forming rectangles having about 3:4 dimensional proportions and a border having about a 3:4 dimensional proportion. A grid may include any number of equal parts, for example, in FIG. 1 the grid comprises four equal parts and sixteen (16) total rectangles to achieve a grid size ratio directly proportional to the corresponding final substrates.

Figure 3:
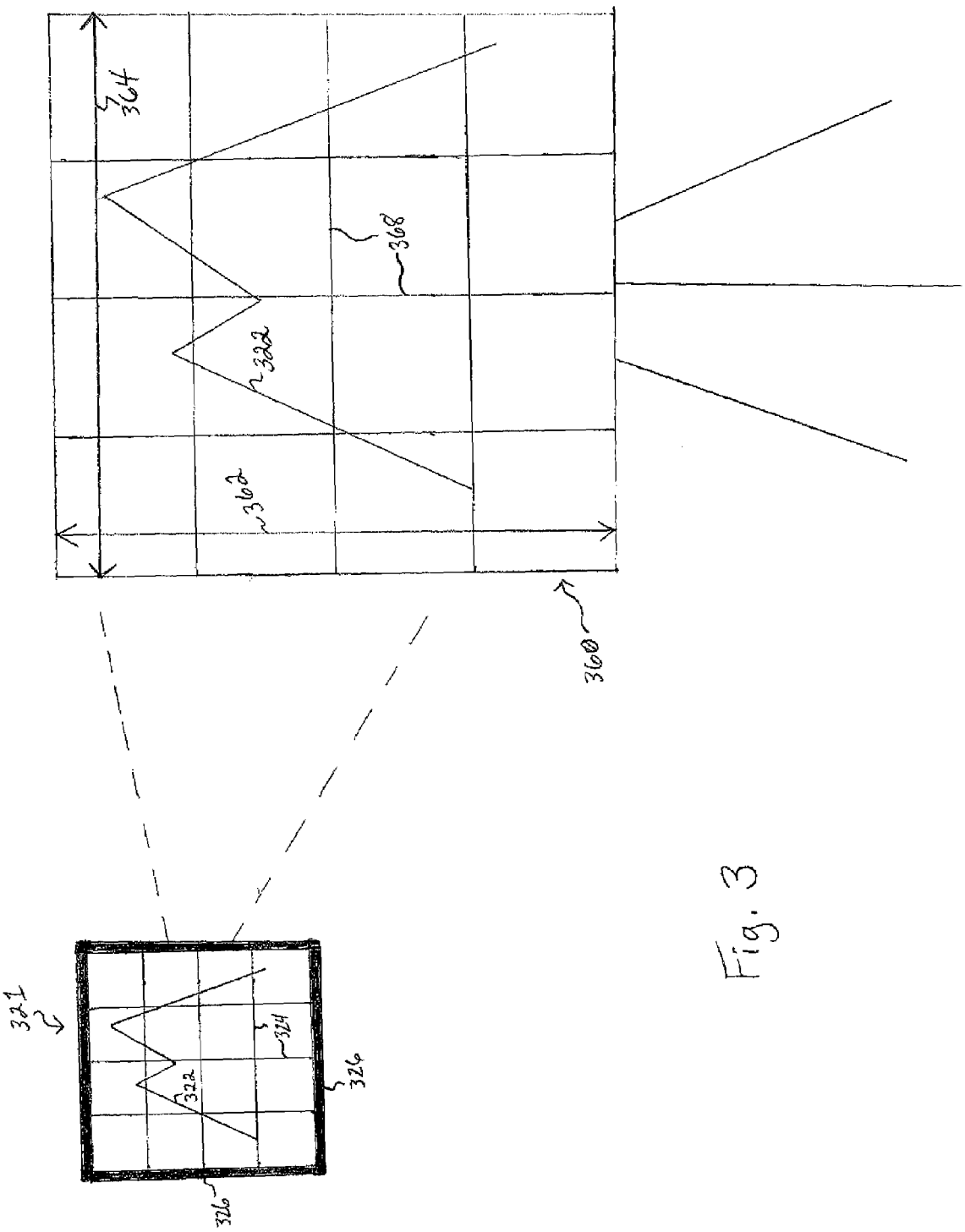
FIG. 3 shows transfer of a composition to a final substrate in accordance with embodiments of the invention.

FIG. 3 shows transfer of a composition to a final substrate in accordance with embodiments of the invention. A composition 322 is sketched within the proportional border 326 on a grid 321. The grid 321 in this case includes a grid size ratio of about 1:1. Thus, the rectangles formed by the symmetrical grid lines 324 feature dimensions having proportions of about 1:1, and the proportional border 326 features dimensions having proportions of about 1:1.

The grid 321 is typically selected based on the dimensions of the final substrate 360 to be used, or the dimensions of the portion of the final substrate to be used. In this case the final substrate 360 is a canvas and the entire canvas will be occupied by the transferred scene, thus the canvas includes outer dimensions, height 362 and width 364, having proportions of about 1:1. The canvas 360 in this case includes a symmetrical grid of lines 368 also, like the grid 321, spaced to form rectangles featuring dimensions having proportions of about 1:1.

Assume, for example, that the canvas in FIG. 3 possesses outer dimensions 362 and 364 of about 24×24 inches. After sketching the composition 322 on the grid 321 having about a 1:1 grid size ratio, the artist can refer directly to the grid 321, such as by placing the grid 321 alongside the canvas 360, when transferring the composition to the canvas. Having the composition fixed on the grid and in the exact same proportion as the canvas allows the artist to transfer the composition directly from the grid to the canvas, and in direct proportion to the composition, hence improving accuracy and efficiency. The composition sketched on a grid having a grid size ratio of 1:1 can be directly transferred in exact proportions to the canvas having outer dimensions of 24 inches by 24 inches. In various embodiments, this direct proportionality is possible for final substrates of conventional sizes using one of nine different grids in accordance with the present invention.

Figure 2:
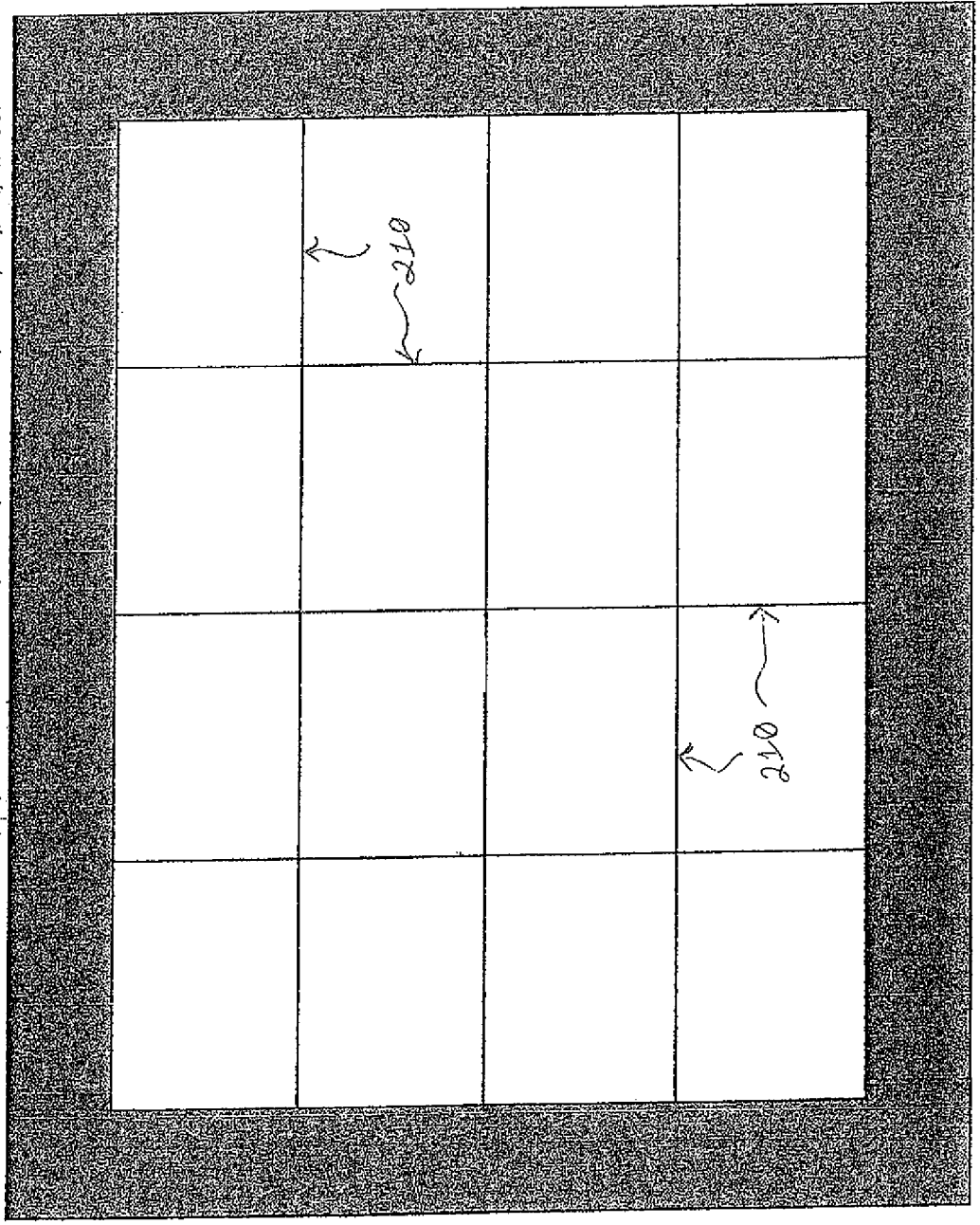
FIG. 2 is an illustration of a grid having a grid size ratio of 3:4 for transferring a composition in accordance with embodiments of the invention.

In various additional embodiments, standardized composition transfer systems of the present invention incorporate proportional border and symmetrical grid line combinations resulting in grid size ratios suitable for transferring compositions to many different sizes of directly proportional final substrates. FIG. 2 is an illustration of a drawing grid 200 featuring a grid size ratio among the symmetrical grid lines 210 of 3:4. The grid size ratio of about 3:4 is by design directly proportional to final substrates having certain dimensions such as 9×12, 12×16, 15×20, 18×24, 21×28, 24×32, 27×36, and so on.

FIG. 3 is another illustration of a drawing grid 300 featuring a grid size ratio among the symmetrical grid lines 310 of 5.5:7. The 5.5:7 grid size ratio is by design directly proportional to final substrates having dimensions such as 11×14, 22×28, 33×42, and so on.

In embodiments, nine different systems (that is, combinations of proportional borders and symmetrical grid lines forming a proportional grid) feature grid size ratios suitable for transferring compositions to many different sizes of directly proportional final substrates. It is to be noted that regardless of the ratio used you will always end up with a equal amount of rectangles vertically as well as horizontally making rectangles that are proportional to the border size. Each of the nine systems features a single grid size ratio as illustrated by the grids in FIGS. 1 through 3. The nine systems comprise grid size ratios as follows: 1:1, 1:2, 1:3, 2:3, 3:4, 4:5, 5:6, 5.5:7, and 7:8. Thus, an artist may select the appropriate directly proportional system of the present invention based on the dimensions of, for example, the canvas the artist plans to use as the final substrate. That is, for a 24.times.30 canvas the artist should select the directly proportional 4:5 composition transfer system in order to most accurately and efficiently create a composition of a scene that is transferable to the 24.times.30 canvas.

In various embodiments, the transparent grid substrate of the present invention may be a flexible thin film or a harder, substantially inflexible piece. The average thickness of the transparent grid substrate may thus vary from about 0.003 inches to about 0.5 inches. In certain embodiments, the transparent grid substrate features a substantially uniform thickness at least in the area of the symmetrical grid lines. The thickness and flexibility selected by an artist may be purely due to the artist's preference, or may be driven by the particulars of a project.

In embodiments, methods of carrying out the present invention comprise: having a substrate, selecting the substrate's ratio from a predetermined group of ratios, choosing a proportional grid in the same ratio as the final substrate; selecting a scene; framing the scene with a transparent drawing grid comprising a transparent grid substrate, the scene viewed through the drawing grid; and sketching a composition of the scene on a substantially uninterrupted transparent surface, the sketching directed on the substantially uninterrupted transparent surface by a proportional border and symmetrical grid lines affixed to the transparent grid substrate. The transparent grid substrate and substantially uninterrupted transparent surface are arranged such that the proportional grid lines and proportional border facilitate sketching the composition directly on the substantially uninterrupted surface in direct proportion to the size of a final substrate. Methods also comprise transferring the composition to the final substrate, the final substrate having dimensions directly proportional to the proportional border and proportional grid lines.

If an artist works outdoors, a substantially inflexible transparent grid substrate may be more resistant to environment factors, such as wind. The substantially inflexible substrate can be held free hand or mounted or clipped onto an immobile object. Mounting the grid on an immobile object ensures that the perspective viewed through the grid by the artist is substantially constant as the artist sketches, thus reducing error and promoting accuracy in the composition. Further, the artist can use an erasable writing instrument, such as a grease pencil or erasable marker, to sketch on the uninterrupted transparent surface. Thus, not only may errors be conveniently corrected, but once a project is completed the composition can be easily removed and the same grid reused for the next project.

Depending on the application it may be appropriate for the affixed lines (symmetrical grid lines plus proportional border) to be on the bottom surface of the transparent grid substrate and have the substantially uninterrupted transparent surface be on the top surface of the same transparent grid substrate. Whether it is desirable to incorporate both features into the same transparent grid substrate may depend on whether it is more desirable to have a flexible or inflexible substrate. For example, it might be less desirable to have a flexible substrate incorporating both features for outdoor projects where wind might be a factor.

In alternative embodiments, the affixed lines are on the surface of the transparent grid substrate and the substantially uninterrupted transparent surface is on a second transparent substrate. This form may be appropriate in situations where, for example, an artist has a flexible transparent grid substrate and wishes to sketch a composition outdoors on a windy day. The second transparent substrate having the substantially uninterrupted transparent surface could be coupled to the transparent grid substrate such that the sketching surface of the uninterrupted transparent surface faces the artist and the transparent grid substrate bearing the grid faces the scene. The artists views the scene through both the second transparent substrate and the transparent grid substrate in order to gain the advantage of both features on separate pieces.

In still further embodiments, a third transparent substrate may be employed with the transparent grid substrate sandwiched between the second and third transparent substrate. This could be appropriate where, for instance, a thin, flexible transparent grid substrate is given support by being positioned between two substantially inflexible transparent grids. The thin, flexible transparent grid substrate also bearing the substantially uninterrupted transparent surface on the top surface would also be appropriate where, for example, an artist desires to overlay a photo on a table with the transparent grid substrate in order to sketch a composition of the photo.

The color of the transparent grid substrate, second transparent substrate, and third transparent substrate may vary as appropriate for a particular project. For instance, an artist may employ a transparent substrate having a reddish tint in order to better distinguish light and dark values in a landscape.

The above description of illustrated embodiments of the invention is not intended to be exhaustive or to limit the invention to the precise forms disclosed. While specific embodiments of, and examples for, the invention are described herein for illustrative purposes, various equivalent modifications including those described above are possible within the scope of the invention, as those skilled in the relevant art will recognize. The teachings provided herein of the invention can be applied to other learning systems, not necessarily the interactive systems described above. The various embodiments above can be combined to provide further embodiments. In general, in the following claims, the terms used should not be construed to limit the invention to the specific embodiments disclosed in the specification and the claims, but should be construed to include all interactive learning and training systems. Accordingly, the invention is not limited by the disclosure, but instead the scope of the invention is to be determined entirely by the following claims, which are to be construed in accordance with established doctrines of claim interpretation.

What is claimed is:

1. A composition transfer system comprising: a transparent grid substrate; lines on a surface of the transparent grid substrate, the lines including symmetrical grid lines and a proportional border around the symmetrical grid lines; said symmetrical lines being of an equal number vertically as horizontally, creating rectangles in the same proportion as the proportional border, thereby making a proportional grid; and a substantially uninterrupted transparent surface that receives a composition related to the scene, the scene viewed through the substantially uninterrupted transparent surface and the transparent grid substrate; wherein the transparent grid substrate and the substantially uninterrupted transparent surface are coupled such that the symmetrical and proportional grid lines and proportional border facilitate drawing the composition directly on the substantially uninterrupted surface in direct proportion to the size of a final substrate.

2. The system of claim 1 wherein the lines are on the bottom surface of the transparent grid substrate and the substantially uninterrupted transparent surface is on a top surface of the transparent grid substrate.

3. The system of claim 1 wherein the transparent grid substrate is substantially inflexible.

4. The system of claim 1 wherein the substantially uninterrupted transparent surface is on a second transparent substrate.

5. The system of claim 4 wherein the second transparent substrate is substantially inflexible.

6. The system of claim 5 further including a third transparent substrate, the transparent grid substrate positioned between the second transparent substrate and third transparent substrate.

7. The system of claim 6 wherein the third transparent substrate is substantially inflexible.

8. The system of claim 1 wherein the transparent grid substrate comprises a substantially uniform thickness in the area of the symmetrical grid lines.

9. The system of claim 1 wherein in the area of the symmetrical grid lines the transparent grid substrate comprises a thickness from about 0.003 inches to about 0.5 inches.

10. The system of claim 1 wherein the final substrate comprises outer dimensions and symmetrical grid lines directly proportional to the dimensions of the symmetrical grid lines and proportional border on the transparent grid substrate.

11. The system of claim 10 wherein the symmetrical grid lines comprise grid size ratios of 1:1, 1:2, 1:3, 2:3, 3:4, 4:5, 5:6, 5.5:7, and 7:8.

12. The system of claim 1 wherein the symmetrical grid lines comprise grid size ratios of 1:1, 1:2, 1:3, 2:3, 3:4, 4:5, 5:6, 5.5:7, and 7:8.

13. The system of claim 1 further comprising a grid made up of the symmetrical grid lines on the transparent grid substrate, the grid comprising four equal parts and sixteen total rectangles.

14. The system of claim 1 wherein the composition is erasable.

15. The system of claim 1 wherein the system bears a measurement device capable of measuring length.

16. A method comprising: selecting a substrate, selecting the substrate's ratio from a predetermined group of ratios, choosing a proportional grid in the same ratio as the substrate; selecting a scene; framing the scene with a transparent proportional drawing grid comprising a transparent substrate, the scene viewed through the proportional drawing grid; and sketching a composition of the scene on a substantially uninterrupted transparent surface, the sketching directed on the substantially uninterrupted transparent surface by a proportional border and symmetrical and proportional grid lines affixed on the transparent grid substrate; wherein the transparent grid substrate and substantially uninterrupted transparent surface are arranged such that the symmetrical grid lines and proportional border facilitate sketching the composition directly on the substantially uninterrupted surface in direct proportion to the size of the final substrate.

17. The method of claim 16 further comprising transferring the composition to the final substrate, the final substrate having dimensions directly proportional to the proportional border and symmetrical grid lines.

18. The method of claim 16 wherein the composition on the composition substrate is erasable.

19. The method of claim 16 further comprising coupling the transparent grid substrate to a second transparent substrate having the uninterrupted transparent surface.

20. The method of claim 16 further comprising coupling the transparent grid substrate between a second transparent substrate and a third transparent substrate.

21. A composition transfer system comprising: a substantially inflexible transparent grid substrate; lines on the bottom surface of the substrate, the lines including symmetrical and proportional grid lines and a proportional border around the symmetrical and proportional grid lines; and a substantially uninterrupted top surface of the grid substrate: wherein the substantially uninterrupted top surface of the grid substrate receives among the symmetrical and proportional grid lines an erasable composition related to the scene, the scene viewed through the grid substrate and proportional border; and wherein the symmetrical and proportional grid lines and proportional border facilitate drawing the composition directly on the substantially uninterrupted top surface in direct proportion to the size of the final substrate.

* * * * *